UNITED STATES PATENT OFFICE.

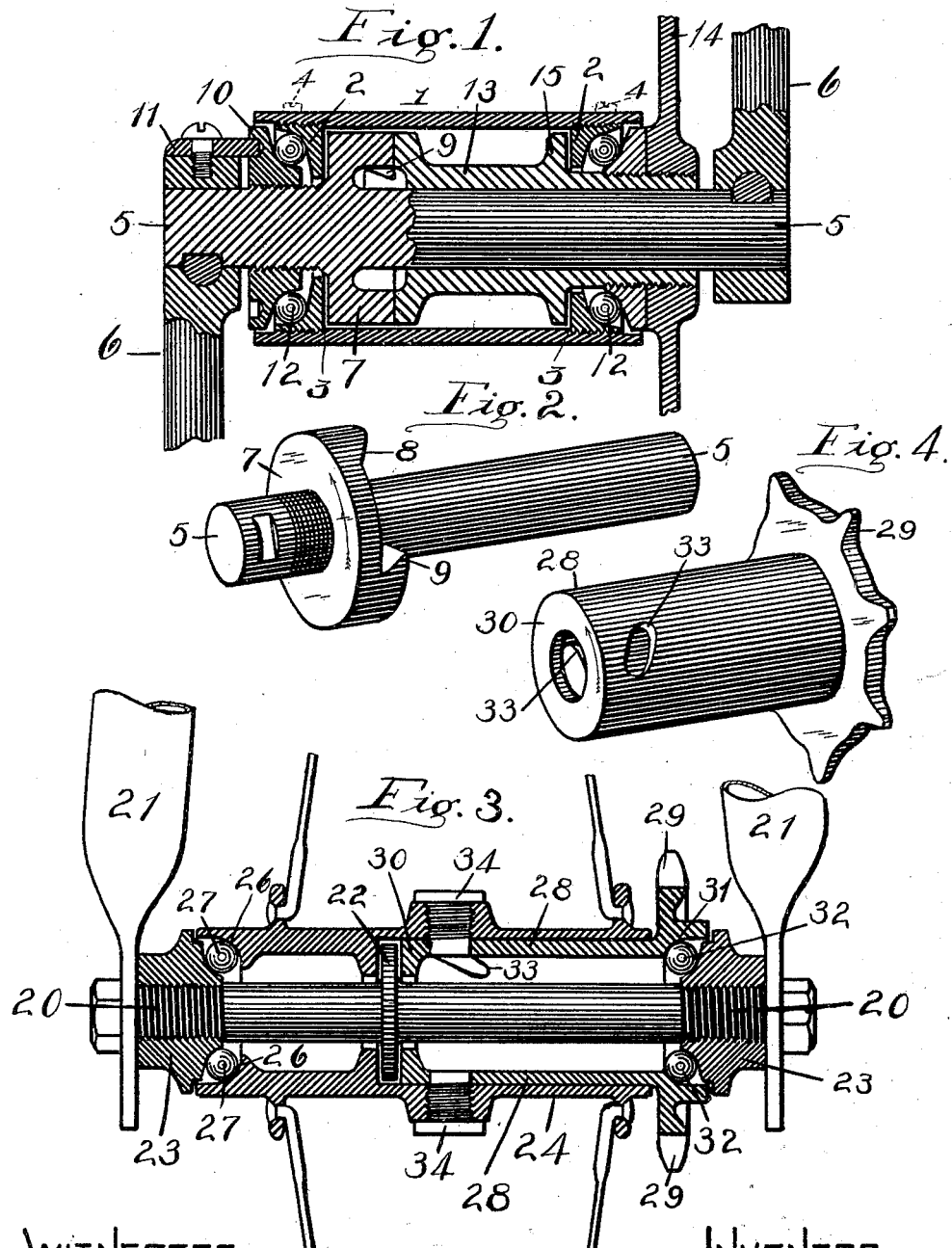

CLARENCE A. MACY, OF ROCHESTER, NEW YORK, ASSIGNOR OF ONE-HALF TO CHARLES V. GROHS, OF SAME PLACE.

BACK-PEDALING BRAKE.

SPECIFICATION forming part of Letters Patent No. 629,040, dated July 18, 1899.

Application filed June 21, 1897. Serial No. 641,628. (No model.)

*To all whom it may concern:*

Be it known that I, CLARENCE A. MACY, of Rochester, in the county of Monroe and State of New York, have invented certain new and useful Improvements in Brakes for Cycles; and I do hereby declare the following to be a full, clear, and exact description of the same, reference being had to the accompanying drawings, forming a part of this specification, and to the reference-numerals marked thereon.

My present invention has for its object to provide an improved brake for cycles whereby the rider may by the operation of back-pedaling produce a frictional resistance or braking action between the rotary member connected with the wheel and a stationary part, and thereby arrest the movement of the cycle; and it consists in certain improvements in construction whereby the parts are simplified, concealed, and are efficiently protected from dust and dirt, all as will be hereinafter fully described, and the novel features pointed out in the claims at the end of this specification.

In the drawings, Figure 1 is a sectional view of a cycle-driving device, showing the invention applied to the crank-axle; Fig. 2, a detached view of the shaft; Fig. 3, a similar view showing the application of the invention to the rear or driving wheel, and Fig. 4 a detached view of the driving-sprocket and sleeve.

Similar reference-numerals indicate similar parts.

Referring particularly to the construction shown in Figs. 1 and 2, which shows my improvements applied to the crank-shaft of a bicycle, 1 indicates the usual tubular shaft-hanger of a bicycle-frame provided with the interiorly-threaded ends, one end having a right and the other preferably a left thread, and in the ends of the hanger are the bearing cones or collars 2, preferably screwed up tightly against shoulders 3, and they may be secured also by screws 4, as in dotted lines. 5 indicates the crank or driving shaft, to the opposite ends of which the cranks 6 are secured in any suitable manner, and upon the shaft is arranged a stationary collar 7, having one side smooth and forming a friction-surface for coöperating with the inner side of the bearing-collar 2 and on the other side a cam-surface 8 and preferably a projection 9. A bearing-collar 10, screwing upon the threaded portion of the shaft, is secured rigidly by an adjustable pin or plate 11, fastened to the crank, and between this collar 10 and one of the collars 2 is arranged a row of bearing-balls 12, as shown. 13 indicates a driven member in the form of a sleeve through which the shaft extends, having secured to its outer end the sprocket-wheel 14, while the portion of the sleeve between the bearings is enlarged at 15, forming a friction-surface to coöperate with the rear side of the bearing-collar 2 at one end of the hanger, and said sleeve is also provided at its other end opposite the sprocket with cam-surfaces corresponding to the surfaces 8 and 9 on the shaft. From this construction it results that when the crank-shaft is driven in the direction of the arrow in Fig. 2 the sleeve and shaft move together by reason of the projections 9, and the power will be applied directly to driving the cycle through the ordinary chain or otherwise; but when the rider desires to check the speed it is only necessary to back-pedal, causing the driving member (the shaft) to move at a relatively slower speed than the driven member, (the sleeve,) when the cam-surfaces 8 will cause a relative longitudinal movement of shaft and sleeve, and the collars 7 and 15 will be brought into frictional engagement with the inner sides of the bearing-cones 2, thereby checking the momentum of the machine.

In Figs. 3 and 4 I have shown a similar construction applied to the rear or driving wheel of the cycle, 20 indicating the stationary axle, attached rigidly to the frame 21 and having the stationary collar 22 thereon, and on either side of the latter the bearing collars or cones 23, adjustably secured to the axle in any suitable manner, as by screwing thereon. 24 indicates the driven member or wheel-hub proper, to which the spokes are attached in any suitable manner, said hub being provided with a collar or ring 25 at one end, having a surface 26, between which and the bearing-collar 23 is arranged a series of bearing-balls 27, and the other side of said ring 25 constitutes a friction or braking surface adapted to coöperate with the outer side of the braking-surface of the collar 22 on the axle. 28 indicates a sleeve fitting within the hub 24, having at the outer end the driving-sprocket 29, and at the other a collar or surface 30, adapted to coöperate with the inner side of the collar 22 on the axle. Beneath the sprocket the sleeve 28 is provided with a cone-surface 31, between which and the bearing-collar 20 is arranged a series of bearing-balls 32, constituting the bearing for the sprocket end of the wheel. The sleeve 28 is further provided with two or more inclined slots or cams 33, adapted to be entered by bolts 34, passing through the hub 24, as shown, the direction of said slots being such that as the sprocket-wheel is being rotated in the direction of the arrow, Fig. 4, the brake-surfaces on the sleeve and hub will be separated from the collar 22 and the machine will move forward; but when the speed of the wheel exceeds that of the sleeve 28, as when the rider is back pedaling, the inclined slots and bolts 34 will draw the sleeve and hub together, and their braking-surfaces will be pressed tightly against the collar 22, effectually arresting the forward movement of the machine.

In both these constructions the braking-surfaces are inclosed between the bearings and are therefore out of sight and effectually protected from dust and dirt.

While the bearing rings or collars are connected to the movable parts of the brake members the amount of movement required to apply the brake is so slight (merely the difference between an actual clamping contact and freedom from contact) that it will not affect the practical running of the wheels, and when the brake is applied the bearings are no more loose than are the bearings of any bicycle in general use. I have practically demonstrated by use of a bicycle provided with my improved brake that the amount of movement necessary to free and set it is not noticeable and does not wear the parts nor interfere with their proper operation to any appreciable extent.

In the form of brake adapted for the crank-hanger it will be noticed that the cranks are both attached rigidly to the same shaft and never change their relative position, which is of course advantageous.

I claim as my invention—

1. In a braking device for cycles, the combination with a rotary driving member, and a rotary driven member concentric therewith, each member having a friction or braking surface, and stationary bearing-surfaces at one end of each of the members, of cam connections between said members for causing their relative longitudinal movement when the speed of the driven member exceeds that of the driving member, and stationary friction or braking surfaces arranged intermediate the bearings with which the friction-surfaces of both of the members engage when moved relatively longitudinally in one direction, substantially as described.

2. The combination with the tubular shaft-hanger, the stationary bearing-collars therein, the driving-shaft having the adjustable bearing-collar at one end, the friction-collar adapted to coöperate with a stationary friction-surface between the bearings, of the sleeve encircling the shaft having the friction collar or surface coöperating with a stationary friction-surface between the bearings, the adjustable bearing-collar, and the sprocket-wheel on the sleeve, and cam connections between the shaft and sleeve for causing the relative longitudinal movements of the sleeve and shaft to cause the engagement of the friction-surfaces when the speed of the sleeve exceeds that of the shaft, substantially as described.

3. The combination with the tubular shaft-hanger, the stationary bearing-collars, removably secured therein, having the outer bearing-surfaces and the interior friction-surfaces, the shaft having the friction-surface coöperating with the friction-surface on one bearing-collar, and the adjustable bearing-collar on the shaft coöperating with the other side of said bearing-collar in the hanger, of the sleeve rotating with the shaft and having a longitudinal movement relative to the latter and having the friction-surface coöperating with the friction-surface on one stationary bearing-collar, the adjustable bearing-collar and the sprocket-wheel on said sleeve, and cam connections between the shaft and sleeve for causing their relative longitudinal movement in opposite directions when the speed of the sprocket exceeds that of the shaft, substantially as described.

4. The combination with the rotary and concentric driving and driven members, supported upon each other, and stationary bearings for one end of each member, said members having a limited relative rotary and longitudinal movement one upon the other, and cam devices for causing the longitudinal movement when said members are relatively rotated, of stationary braking or friction surfaces intermediate the stationary bearings of the members, and corresponding braking or friction surfaces on the two members for engaging the stationary surfaces when the members are moved relatively longitudinally, substantially as described.

CLARENCE A. MACY.

Witnesses:
F. F. CHURCH,
G. A. RODA.